United States Patent

Morgan et al.

[15] 3,679,045
[45] July 25, 1972

[54] CONVEYOR SYSTEM

[72] Inventors: George W. Morgan, 1400 Douglass, Space 112, Anaheim, Calif. 92806; Douglas S. Whitney, 2616 E. Norm Place, Anaheim, Calif. 92800

[22] Filed: Sept. 14, 1970

[21] Appl. No.: 71,958

[52] U.S. Cl. ............................................................198/203
[51] Int. Cl. .....................................................B65g 23/00
[58] Field of Search..................198/135, 141, 143, 145, 203, 198/218, 221, 224, 110; 74/37

[56] References Cited

UNITED STATES PATENTS

| | | | |
|---|---|---|---|
| 1,998,757 | 4/1935 | Hauk | 198/135 |
| 1,706,905 | 3/1929 | Stockly et al. | 198/203 X |
| 2,595,689 | 5/1952 | Mitchell | 198/143 |
| 3,312,333 | 4/1967 | Anderson | 198/145 |

Primary Examiner—Evon C. Blunk
Assistant Examiner—H. S. Lane
Attorney—Christie, Parker & Hale

[57] ABSTRACT

A conveyor system particularly useful for handling domestic waste or the like is described. The conveyor receives dumped waste, conveys it up an incline, and dumps it into a receiving silo from which it may be discharged as desired. A dumping station prior to the silo can be employed for selectively removing articles from the waste. The conveyor comprises a plurality of carts mounted between rails forming a continuous loop track. The carts are interconnected by cables to form a continuous conveyor with the carts intermittently spaced along the cables. In order to drive the conveyor, a reversible chain drive is employed with a pair of pawls on separate portions of the chain so that they move in opposite directions along the extent of the track. The pawls permit passage of the carts when the pawls are moving in the reverse direction and they engage the cart when moving in a forward direction for driving the conveyor in a hand-over-hand fashion. A pair of such sets of driving pawls are provided on the two sides of the conveyor respectively so as not to interfere with a selectively openable bottom on the carts.

16 Claims, 10 Drawing Figures

Patented July 25, 1972
3,679,045
4 Sheets-Sheet 1
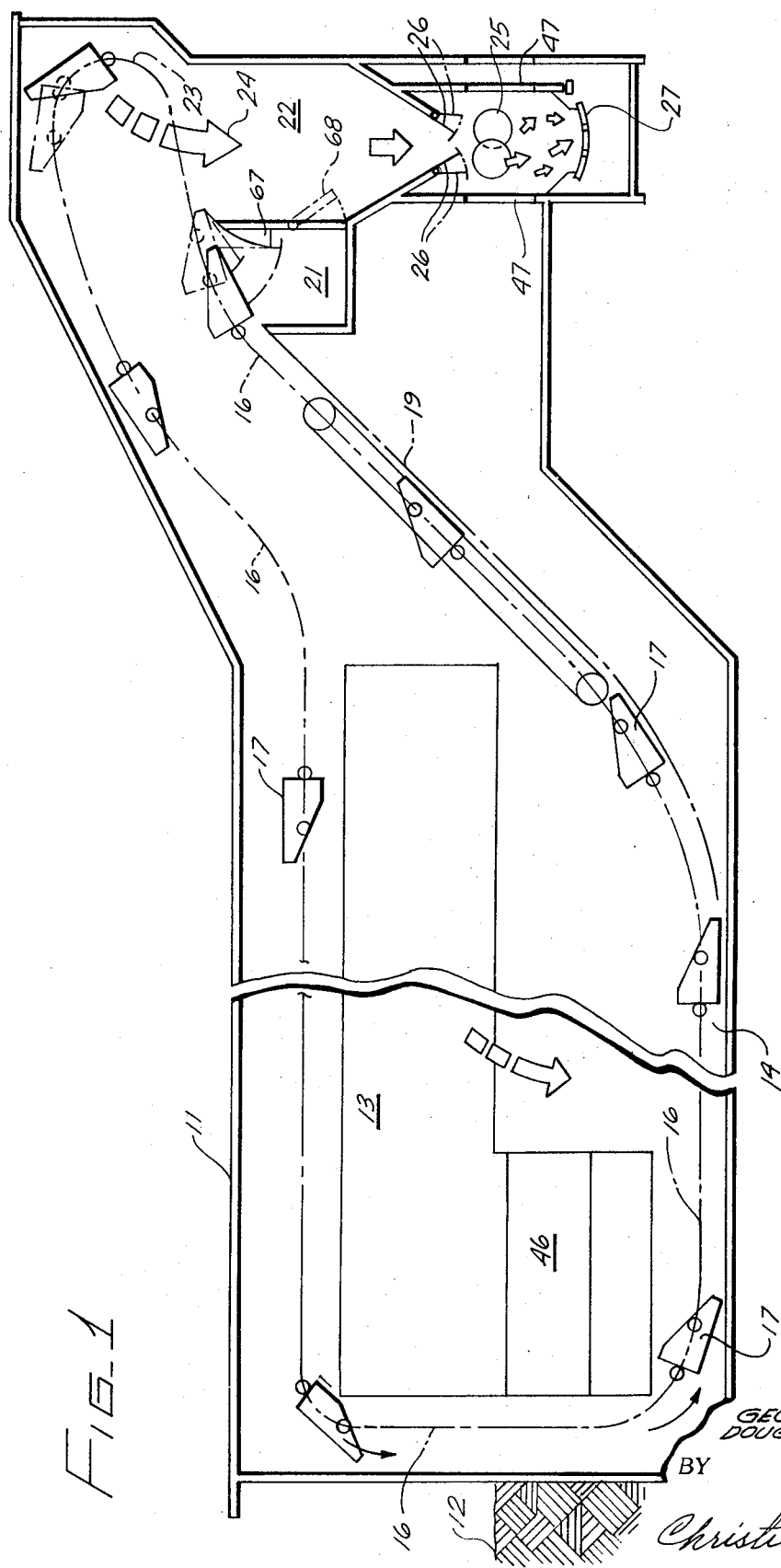
INVENTORS.
GEORGE W. MORGAN
DOUGLAS S. WHITNEY
BY
Christie, Parker & Hale
ATTORNEYS Patented July 25, 1972 3,679,045
4 Sheets-Sheet 2
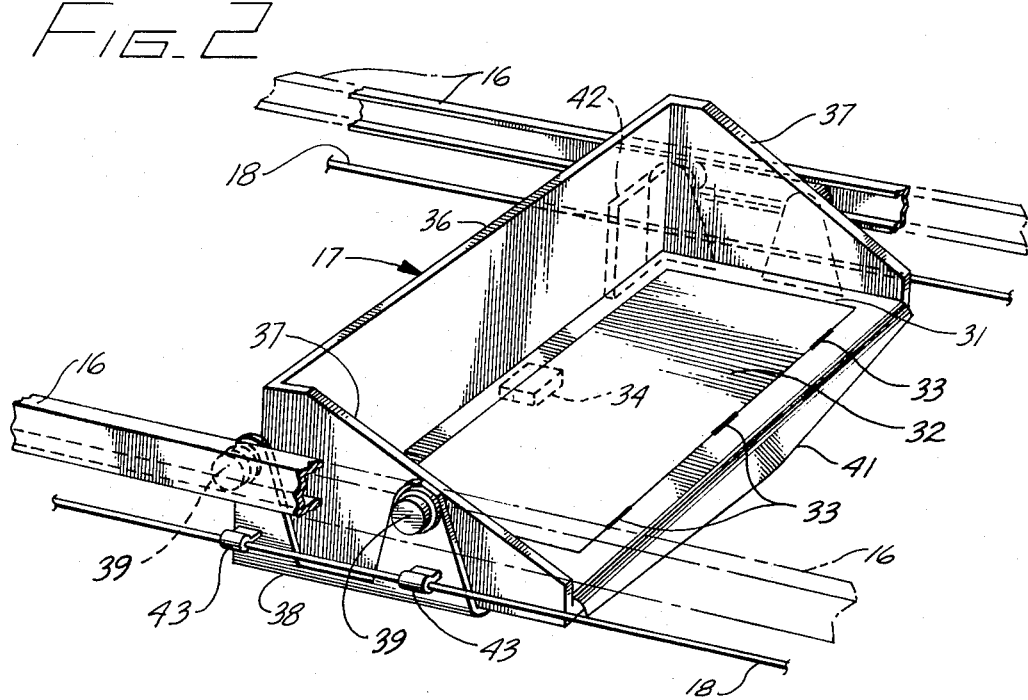
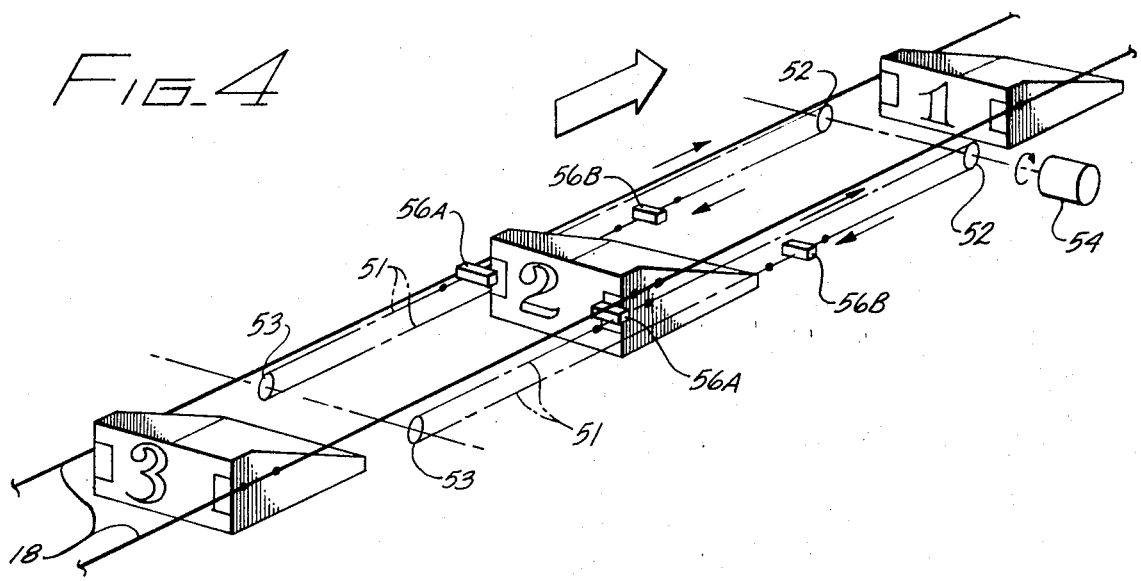

Patented July 25, 1972

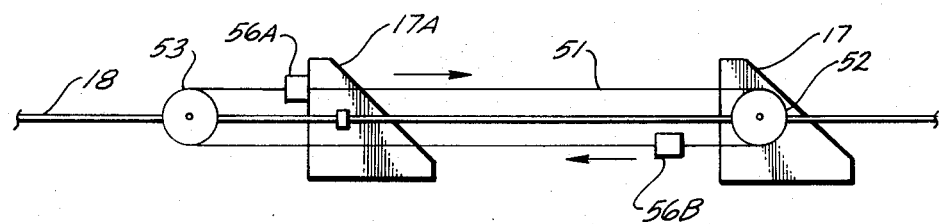
FIG_6A
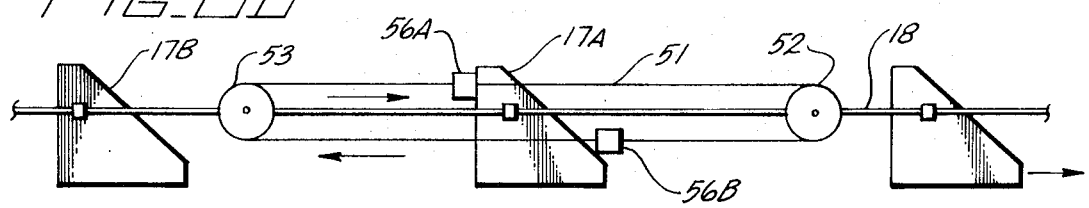
FIG_6B
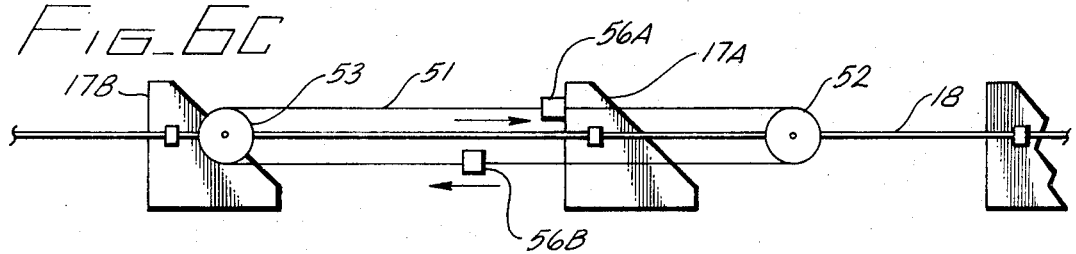
FIG_6C
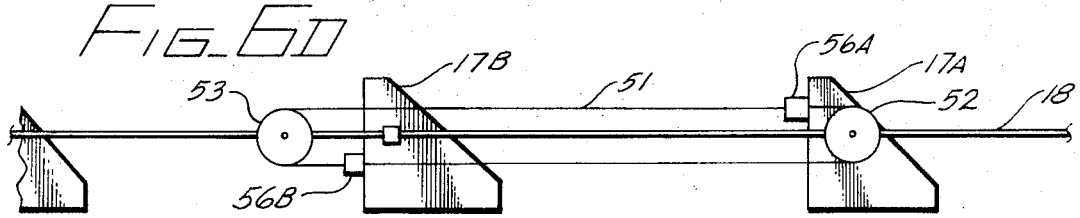
FIG_6D
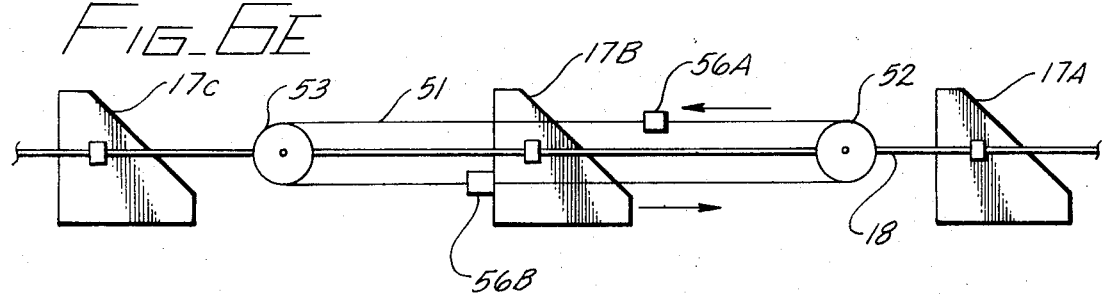
FIG_6E

CONVEYOR SYSTEM

BACKGROUND OF THE INVENTION

In our modern day, affluent society great volumes of domestic wastes are produced and discarded. This waste is a melange of the articles found in our homes and industries, and includes many salvageable commodities such as waste paper, rags, glass, cardboard and a variety of reusable metals. Many, many of these articles are presently discarded and buried in sanitary fill dumps. It is highly desirable in order to preserve our natural resources and maintain the quality of the environment to reclaim and recycle as much of this reclaimable material as possible.

These waste materials are presently picked up in trucks or the like and hauled to a central dumping location where they are discarded. In order to reclaim such materials it is desirable to present them to either manual or automatic sorting equipment in a relatively steady, controllable flow. In order to accomplish this, means are required for conveying the materials from the trucks as dumped, to some metering arrangement for controlling the flow through the balance of the sorting system. The conveyor provided must accept a random selection of materials in quite variable volume and having a large variety of components. The conveyor must be rugged, relatively large, and as inexpensive as possible, yet reliable in operation under the adverse conditions to which it is subjected. The conveyor should allow for ease of maintenance and replacement of components as may be required quickly and easily without great precision in the replacement.

BRIEF SUMMARY OF THE INVENTION

Thus in practice of this invention according to a presently preferred embodiment there is provided a conveyor system having a continuous conveyor which is caused to convey articles by a pair of driving members in engagement with a portion of a length of the conveyor. The pair of driving members alternately engage the conveyor in hand-over-hand fashion.

In a preferred embodiment the conveyor has a plurality of carts moving between rails and interconnected by a linear flexible drive. Driving pawls engage the carts successively and alternately for driving the carts in a forward direction between an article receiving portion and an article dumping portion of the conveyor.

DRAWINGS

These and other features of the invention will be appreciated as the same becomes better understood by reference to the following detailed description of a presently preferred embodiment when considered in connection with the accompanying drawings wherein:

FIG. 1 illustrates in side schematic section a dumping station and conveyor constructed according to principles of this invention;

FIG. 2 is a perspective view of a cart in the conveyor FIG. 1;

FIG. 4 is a schematic perspective view of the conveyor of FIG. 1;

FIGS. 6A through 6E are schematic illustrations showing successive operation of the driving means for the conveyor.

Throughout the drawings like numerals refer to like parts.

DESCRIPTION OF THE PREFERRED EMBODIMENT

Figure 3:
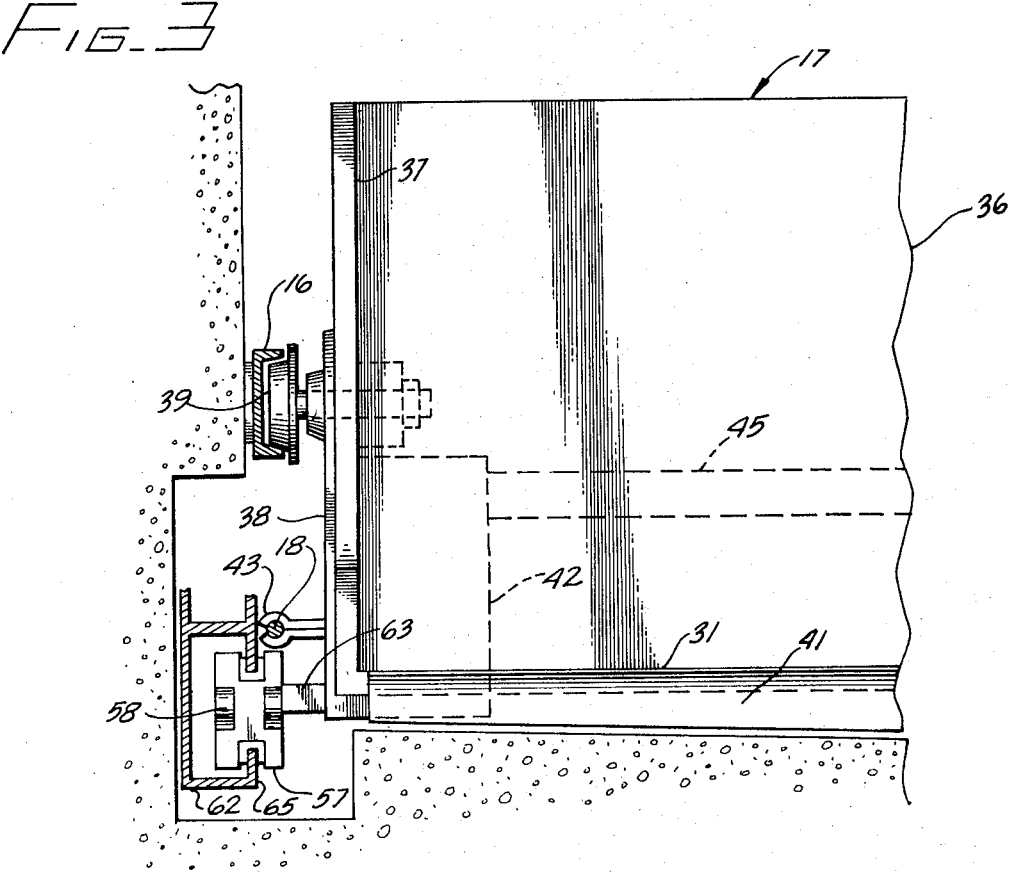
FIG. 3 is a fragmentary view transverse to the conveyor of FIG. 1.

FIG. 1 illustrates in side section, somewhat schematically, a dumping station and refuse conveyor constructed according to principles of this invention. As illustrated in this presently preferred embodiment a building 11 stands above ground level 12 and includes a subterranean portion where at least some of the operations involved in practice of this invention may occur. At ground level a large opening 13, which is preferably provided with closeable doors (not shown), is provided along one side of the building. Refuse trucks have access to the opening 13 and are backed up to the opening for discharging loads of refuse into the building. Such refuse dumped from the trucks falls into the lower subterranean portion of the building. If desired, a track mounted crane (not shown) can be provided along the opposite side of the building from the opening 13 for manipulation of portions of the refuse as may be required and for assisting trucks in unloading.

Refuse dumped from the trucks falls to a receiving portion 14 of a continuous conveyor running through the building. The receiving portion 14 of the conveyor and the building 11 can be as long as desired to provide the required number of dumping stations along its length so that refuse trucks do not have a prolonged wait for access to the station. Such length is largely dependent, of course, on the volume of refuse to be handled in the station. The refuse receiving portion of the conveyor is located in the bottom of a rectangular trough (not shown in cross section) which may have sloping sides near the upper portion to form a type of temporary detention when large volumes of refuse are encountered, and further to funnel refuse from the truck-dumping stations to the bottom of the trough.

A refuse conveyor system constructed according to principles of this invention extends along the bottom of the trough through the refuse receiving portion 14 of the structure. The conveyor comprises a pair of parallel tracks 16, the loop course of which through the structure 11 is illustrated schematically in FIG. 1. A plurality of carts 17 or the like are mounted for movement along the tracks 16 through the building. The carts 17 are intermittently or randomly spaced along the track without any required precise spacing therebetween. Because of the driving mechanism hereinafter described, the carts need not be periodically spaced. The carts are interconnected by flexible cables 18 (FIGS. 2 to 4) extending in a continuous loop along the extent of the tracks. The interconnection of the carts 17 is provided so that driving of one or more of the carts anywhere along the continuous loop results in all of the carts traveling in synchronism along the tracks through the entire system.

The tracks 16 extend in a continuous loop through the refuse receiving portion 14 of the building. The tracks then proceed upwardly along an inclined ramp 19 to a sufficient elevation that refuse handled in the station can flow by gravity through a flow control station to a conveyor. Adjacent the top of the ramp 19 is an emergency dumping station or bin 21 over which the tracks pass. The tracks then pass over a silo 22, and in a portion over the silo the tracks curve into a reverse direction in a vertically extending arc 23 which serves to invert the carts 17 so that any refuse therein falls into the silo 22 as indicated by the arrow 24. The carts, which are now inverted, travel along the tracks 16 along the upper portion of the building, including that portion above the ramp 19 and the refuse receiving portion 14. At the far end of the building from the silo 22, the tracks make two sweeping turns to bring the carts 17 down from the upper portion of the building and into an upright orientation as they again enter the portion of the loop through the refuse receiving portion 14 of the building.

Refuse dumped into the receiving portion 14 is picked up by the carts 17 and conveyed up the ramp 19, over the emergency dumping bin 21, which may be employed as hereinafter described, and is dumped into the silo 22 as the carts invert. The slope of the ramp 19 is preferably greater than the typical angle of repose of refuse so that refuse is carried up principally as contents of the carts with little refuse being pushed ahead of the carts. Any excess falls over the back of the carts and is picked up by subsequent carts.

The refuse in the silo 22, which can be of any desired vertical extent, passes downwardly and between a pair of hinge-mounted doors 26 which can be controllably moved together or apart for controlling the flow of refuse out of the bottom of the silo. Refuse passing through the opening between the doors 26 falls into a disintegrator 25 which is in the form of a plurality of interlocking star wheels turning at different angular velocities so that there is a shearing or tearing action therebetween. This serves to break up boxes of refuse, tear open plastic or paper bags, and bend or break large objects. The disintegrator does not grind or shred the refuse in the usual sense, but serves to break up the larger aggregations of refuse for subsequent sorting to recover valuable articles such as paper, metal, glass, rags or the like. From the disintegrator 25 the refuse falls onto a conveyor 27 in the form of a conventional moving belt extending transverse to the greater extent of the building 11.

FIG. 2 illustrates in perspective one of the carts 17 between the parallel rails 16. FIG. 3 illustrates in fragmentary front view one of the sides of the cart 17. Each of the carts in a preferred embodiment comprises a substantially flat bed 31, the principal portion of which is made up of a bottom door 32 connected to the bed 31 along its forward edge by a plurality of hinges 33. A catch or latch 34 indicated schematically in FIG. 2 is provided at the rear portion of the door 32. The latch 34 is a conventional spring-loaded catch or the like that permits the door 32 to open when the weight thereon exceeds some preselected value. The bed of the car 17 is bounded along its rearward edge by a vertically extending back 36, the height of which is selected for containing a desired volume of refuse within the cart. Bed of the cart is bounded along its side edges by vertical sides 37 gradually increasing in height from front to rear, or other similar sides that may serve to contain refuse within the cart.

Along each side of the cart is a relatively heavy-duty frame member such as, for example, a heavy steel casting 38. The side member such as, for example, a heavy steel casting 38. The side member 38 is rigidly connected to the side 37 of the cart and serves to mount a pair of wheels 39 which fit within the open channel of the substantially U-shaped rail 16. Since the opposed rails 16 are in the form of U-shaped channels, the wheels 39 engage the lower portion of the channel whether the cart is in its upright position as illustrated in FIG. 2 or in its inverted position when returning through the building as illustrated in FIG. 1. Thus, the wheels 39 and side members 38 support the weight of the cart and its contents, if any, from the tracks 16 during operation of the system.

During travel of the carts through the refuse receiving portion (FIG. 1) they travel above the bottom of the trough. Therefore a downwardly extending lip 41 or scraper is provided along the leading edge of the bed 31 for minimizing the refuse left in the bottom of the trough.

The side frame members 38 each include a strong bumper block 42 on the back of the cart and, if desired, these blocks may be interconnected by a transverse stiffening rib 45 to prevent racking and maintain the plan profile of the cart substantially rectangular. The side frame members 38 also include conventional cable clamps 43 which during operation are connected to the flexible steel cables 18 that interconnect the carts in the loop extending around the building. It will be apparent that in lieu of a pair of cables, one or more chains or similar flexible linear driving members can be employed with suitable clamps or connecting devices between the chain and the carts 17. Preferably, the entire side member 38 is readily removable from the body of the cart so that cable clamps, flanged wheels, bumper blocks and the like can be replaced quickly and easily for inexpensive maintenance without disabling the entire conveyor system for any substantial period of time.

It should be noted that maintenance requirements are well accommodated in the embodiment illustrated in FIG. 1. Thus, for example, access to the carts is readily provided from beneath the ramp 19, or, if preferred, from an elevated work station on the portion of the loop along which the carts return in their inverted position. An emergency dumping station 46 is provided at one end of the building 11 so that, at such times as the conveyor must be stopped for maintenance, dumping of refuse trucks into the dumping station 46 can be continued without completely filling the refuse receiving portion 14 through which the conveyor passes. Refuse accumulated in the emergency dumping station 46 can then be transferred to the conveyor system at a convenient time by any of a variety of means, such as, for example, conveyors, a crane, a tractor, or gravity chutes. Maintenance is also accommodated on the conveyor 27 by elevating the conveyor a substantial distance above floor level in the region through which it passes, and by providing doors in the region between the bottom of a silo 22 and the conveyor 47. This allows maintenance of the doors 26 and conveyor 27, as well as the opportunity to clear articles from the disintegrator 25.

In order to drive the conveyor of interconnected carts through the loop illustrated in FIG. 1, some way must be provided for applying forces to the cables 18 interconnecting the carts. A major problem in cable-driven systems has always been a reliable, sturdy and economical means for engaging the cable to apply such a force to it. A plurality of wraps around a large drum or sheave can be employed in some situations, however, this is impractical where, as in the illustrated embodiment, the plurality of carts or the like are intermittently spaced along the length of the cable and firmly attached thereto. Means for repeatedly grabbing the cable and pulling it along have not been satisfactory for long-term, reliable use. Provision of driving lugs along the length of the cable or use of a chain or the like can provide a means for driving, however, these require a degree of periodicity in the lugs for steady engagement by the driver in order to obtain substantially smooth motion.

In order to obtain substantially continuous motion as illustrated in the conveyor system, means are provided for engaging each successive cart and driving it along the length of a portion of the track. Since the balance of the carts are connected to the one being driven, the entire loop of carts is therefore drawn around the track. Because each of the carts is firmly connected to the cables 18, engagement with the carts amounts to engagement with the cables without any necessity of actually gripping the cables with a driver.

It is preferable in construction and operation of a system as provided in practice of this invention that the carts be intermittently or randomly spaced along the length of the cables rather than at periodic intervals so that no great care need by taken in where a cart is positioned when it is replaced, for example. Intermittent positioning of the carts is also desirable since in some applications it may be preferred to have the carts relatively closely spaced, and in other situations, a relatively long spacing between the carts is quite acceptable. The preferred driving means is therefore suitable for engaging successive carts independent of the degree of spacing therebetween.

The driving mechanism is provided along the ramp 19 since during this portion of the travel of the carts around the loop the loads are greatest on the conveyor system. During this stretch, the loaded carts are being drawn uphill and the cables interconnecting the carts must also transmit the loads imposed on following carts as they pick up refuse in the receiving portion 14 of the station. Around the balance of the loop, with the short exception of the portion over the emergency bin 21 and silo 22, the carts are unloaded and merely idling along the track to return to the receiving portion. Cable sheaves (not shown) are provided around the turns such as the arc 23 and return bends at the entrance of the receiving portion 14 of the loop. It is preferable that the load on the cables at this portion of their travel be relatively light so that damage to and by the cable clamps does not become a problem.

The means for driving the string of carts is illustrated schematically in FIG. 4, and also in the sequence of positions illustrated in FIGS. 6A through 6E which show the operating arrangement. A detail of the driving system is illustrated in perspective in FIG. 5. The driving system comprises a pair of substantially identical driving chains 51 on opposite sides of the conveyor. Each of the chains is in a continuous loop around a driven sprocket wheel 52 and in idler sprocket wheel 53. The axes of the sprocket wheels 52 and 53 approximately intersect the two interconnecting cables 18 so that the two operating reaches of the chains 51 are respectively above and below the cable 18 by approximately equal amounts. It will be apparent to one skilled in the art that additional idler pulleys or the like can be employed as desired so that the drive sprocket wheels 52 are out of line with the cables. The two driven sprocket wheels 52 are mechanically interconnected so as to drive in synchronism, and both are connected to a reversible driving motor 54. In the schematic illustration of FIG. 4, the driven sprocket wheels are shown aligned with the cables 18 and no specific mechanical interconnection is provided, however, it will be apparent that if the drive sprocket wheels 52 are out of the plane of the cables 18 at this point, they can both be mounted on a single shaft. Other equivalent driving arrangements can, of course, be provided. It will also be apparent that if desired instead of using a reversible electric motor 54 a single direction motor can be employed with a direction reversing mechanism between the motor and the drive sprocket wheels.

A driving lug 56 is provided on each reach of each chain 51 for a total of four driving lugs, two on each side of the carts. The upper lugs are designated 56A and the lower lugs 56B for describing the mode of operation. Since the upper and lower driving lugs 56A and 56B are on separate reaches of the chain 51, it will be apparent that as illustrated in FIG. 4, when the reversing motor 54 is rotating in a clockwise direction the upper driving lug 56A is traveling forwardly, that is, in the same direction as the carts and the lower lug 56B is moving in the reverse direction. Such a driving arrangement is also illustrated in FIG. 6A wherein the carts move from left to right in the drawing. As illustrated in this figure, one of the carts 17A connected by the cables 18 to other carts 17 is being driven by a lug 56A in the forward direction. Each of the lugs is provided with a mechanism for engaging the bumper block 42 (FIGS. 2 and 3) on the back of a cart as hereinafter described and illustrated in FIG. 5. During this portion of operation the upper lug 56A is driving forwardly and the lower lug 56B is returning on the lower reach of the chain 51.

As the driving continues, as illustrated in FIG. 6B, the cart 17A is driven further along the reach of chain 51 by the upper lug 56A and the lower lug 56B reaches the cart 17A and passes it by, as illustrated in FIG. 6C. Meanwhile the next cart 17B is approaching since it is connected to the first cart 17A by the cables 18.

When the driving lug 56B passes the second cart 17B and is in a position immediately behind the cart, as illustrated in FIG. 6D, the reversing motor 54 (FIG. 4) is signaled to reverse direction. FIG. 6D illustrated the instant of reversal when the chain 51 is not moving, and the lugs 56A and 56B are both in engagement with the respective carts 17A and 17B. Reversing of the drive causes the driving lug 56B in engagement with the cart 17B to proceed in the forward direction, carrying the cart 17B along with it. Meanwhile the upper lug 56A on the returning reach of the chain moves in the reverse direction and the first cart 17A passes on along the loop drawn by the cables 18. Driving of the second cart 17B through the span between the sprocket wheels 52 and 53 brings a cart 17C forward for engagement by the upper driving lug 56A in a sequence substantially the same as that hereinabove described. Thus, during operation the two driving lugs 56A and 56B on each of the chains 51 successively engage successive carts for pulling them forwardly in what can be considered a hand-over-hand fashion. Thus, the two lugs 56A and 56B alternately engage successive carts, and upon engagement, reverse direction so that the conveyor is constantly driven in the forward direction.

Figure 5:
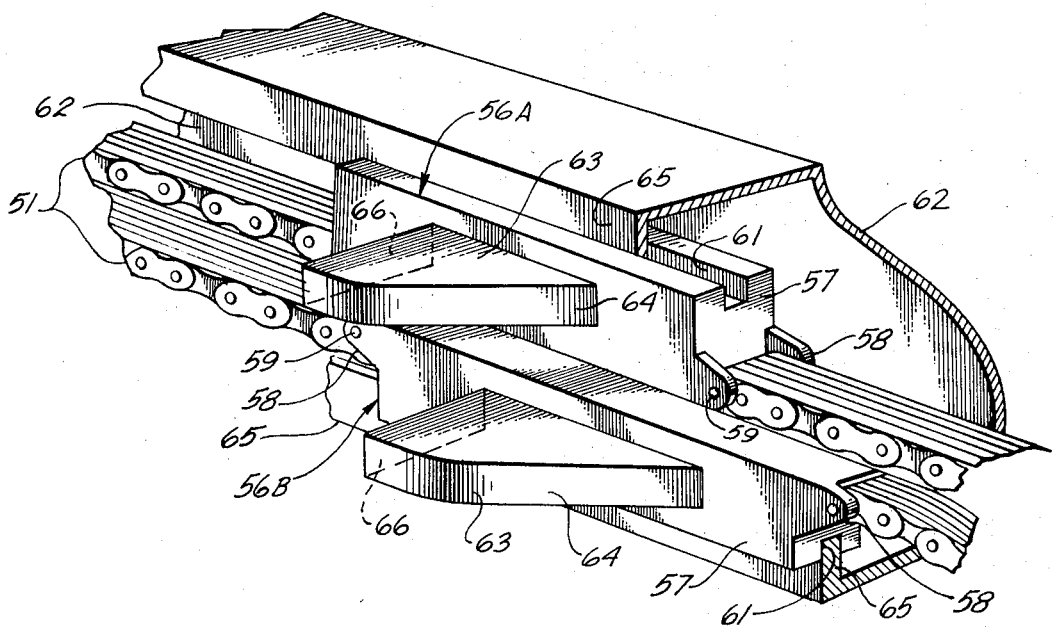
FIG. 5 is a perspective of a means for driving the carts of FIG. 2.

FIG. 5 illustrates in perspective cutaway a pair of the driving lugs 56A and 56B in that portion of their travel along the two reaches of the chain 51 where they are adjacent each other. These lugs are viewed from a rearward direction, that is, as if the carts advanced from right to left in the drawing. In a preferred arrangement, the chains 51 are conventional roller chains and the driving lugs each comprise a body 57 having ears 58 at its forward and aft ends for connection to the chain in lieu of conventional links thereof. By substituting the driving lugs for links of the chain, the driving forces are maintained substantially in line with the chain so that no substantial twisting is encountered. The body 57 of each of the driving lugs is provided with a longitudinally extending groove 61 along both its upper edge and its lower edge. Engaging each of the grooves 61 is a flange on a substantially E-shaped guide rail 62. The guide rail 62 extends parallel to the track 16 and the flanges 63 prevent the driving lugs from shifting laterally relative to the carts.

Mounted on each of the bodies 57 is a substantially triangular tongue or pawl 63. The pawl is spring loaded in a conventional manner so as to be biased toward an extended position as illustrated in FIG. 5 and resiliently movable to a retracted position for passing a cart. Thus as a driving lug traveling rearwardly relative to the carts reaches a cart, the sloping ramp 64 on the rearward portion of the pawl 63 engages the cart and depresses the pawl in substantially the same manner a lock bolt on a door operates. When the spring loaded pawl passes behind a cart it is biased outwardly and snaps back to its original extended position. When the lug is driven forward by the forward face 66 on the pawl, which is normal to the extent of the chain, engages the bumper block 42 (FIG. 2) on the rear of the cart.

Referring again to FIG. 6B, when the lower driving lug 56B reaches the cart 17A the pawl (not shown in FIG. 6) is retracted by engagement with the cart and remains retracted as it passes the cart, snapping back into its extended position after the cart has passed such as in the position illustrated in FIG. 6C. Similarly, the pawl retracts as the lug 56B passes the cart 17B and snaps back into its extended driving position when the cart 17B is passed.

A switch (now shown) is incorporated in each of the driving lugs to provide a signal each time the pawl springs back to its extended position. These signals are employed for reversing the motor 54 (FIG. 4) when both lugs 56B, that is, on opposite sides of the cart, have their pawls extended. An extremely simple control system is all that is required since all that is needed is to sense when both pawls are extended for the second time in each cycle. Thus, the pawls are depressed once upon engagement with the first cart and spring to an extended position when the cart is passed. The signal indicating that the pawl has been extended can be employed, for example, to set a flip-flop and then when the pawl is extended for the second time when the second card is passed, the flip-flop can be reset and the drive motor reversed. The signals from the driving lugs on both sides of the carts are employed for reversing the motor so that it is assured that both pawls are engaged with the sides of the cart so that both sides are driven and the cart is not twisted in the track. Since the driving lugs are positioned opposite each other on the two chains 51, and the two are driven in synchronism, the carts are maintained in a substantially straight line at all times.

The driving arrangement for the conveyor is simple and reliable and can be built with quite heavy components at relatively low expense since it is not necessary to have precision machining of any of the parts. Since only moderate precision is required, manufacture is inexpensive and maintenance is minimized. Worn or damaged driving lugs are readily removed from the drive chain and replaced as required.

Referring again to FIG. 1, at the upper end of the ramp 19 an emergency dumping bin 21 is provided prior to the portion of track over the silo 22. When the carts 17 reach the region above the dumping bin 21, the bottom door 32 in the cart is no longer supported by the bottom of the trough through which the cart travels. When normal refuse is being handled, the strength of the spring catch 34 (FIG. 2) is sufficient to keep the door 32 closed, and refuse in the cart remains therein for dumping into the silo when the cart inverts at the end of the conveyor. If on the other hand a heavy object, such as, for example, a large piece of concrete happens to be in the refuse, the additional weight causes the door 32 to fall open over the emergency bin 21 and permit the refuse, including the heavy object to fall into that bin. Bulky objects or articles that might damage the refuse disintegrator 25 are preferably picked from the refuse by the crane (not shown) in the refuse receiving portion 14 of the station. If such an article should be carried by the carts into the region of the emergency dumping bin, an operator can independently release the latch 34 either by an independent triggering mechanism (not shown) beneath the ramp at the entrance to the bin, or by addition of force to the door while it is over the bin.

The far side of the dumping bin includes a camming portion 67 that engages the open door (if any) hanging from the bottom of the cart and cams it to a closed position for return to the refuse receiving portion of the station. If desired, the door can be closed at some later point in the travel when the cart is inverted. Any heavy or bulky items dumped into the emergency dumping bin 21 are retrieved individually, and the remaining refuse in the bin is then dumped into the stream going through the silo by opening a door 68 therebetween. In this manner, heavy or bulky items are removed from the flow of refuse for preventing damage to the disintegrator 25.

Because of the bottom dumping feature provided for separating heavy or large articles, a continuous central cable interconnecting the carts is not practical and a single cable also suffers from an inability to retain the carts in line in case of a load that would skew one of them in the tracks. Such a system would be quite susceptible to jamming. Similarly a central driving system midway between the carts has limitations in maintaining the carts in a non-skewed path. A central driving system beneath the carts is also quite susceptible to clogging due to accumulation of refuse in the mechanisms. Provision is therefore made for driving from the two sides of the carts.

One specific example of a conveyor system constructed according to principles of this invention has been described and illustrated herein. Many modifications and variations will be apparent to one skilled in the art. Thus, for example, a conveyor having driving mechanism as herein described may be employed for raw materials or finished products instead of in a refuse collection station. The exact layout of such a station can also be varied, such as, for example, by providing taller or larger silos, multiple silos, or auxiliary functions, such as, fumigation, dehydration or the like. Many modifications and variations will be apparent to one skilled in the art, and it is therefore to be understood that within the scope of the appended claims the invention may be practiced otherwise than as specifically described.

What is claimed is:

1. Means for driving a continuous conveyor comprising:
   a plurality of driven members connected intermittently along the conveyor;
   first means for engaging a first one of the members for driving it in a first direction;
   second means for engaging a second one of the members for driving it in the first direction; and
   means for moving the first means in a second direction opposite to the first direction when the second means is moving in the first direction, and for moving the second means in the second direction when the first means is moving in the first direction.

2. Means for driving a continuous conveyor as defined in claim 1, further comprising:
   means for reciprocating the first and second means alternately in the first and second directions.

3. Means for driving a continuous conveyor as defined in claim 1 wherein the distance of movement of the second means in the first direction in engagement with a second one of the members is independent of the distance of movement of the first means in engagement with a first one of the members in the first direction.

4. Means for driving a continuous conveyor as defined in claim 1 wherein the first and second members adjacent each other in succession along the conveyor and wherein engagement of the first means with the first member is in alternation with engagement of the second means with the second member.

5. Means for driving a continuous conveyor as defined in claim 1 wherein the first means is alternately engaged and disengaged while the second means is alternately disengaged and engaged respectively.

6. Means for driving a continuous conveyor as defined in claim 1 further comprising:
   third means for engaging the first one of the lugs for driving it in the first direction in synchronism with the first means for engaging; and
   fourth means for engaging the second one of the lugs for driving it in the first direction in synchronism with the second means for engaging.

7. Means for driving as defined in claim 6, wherein the first and second means for engaging are on one side of the conveyor and the third and fourth means for engaging are on the opposite side of the conveyor.

8. Means for driving a continuous conveyor as defined in claim 1 wherein the first and second means for engaging each comprise pawl means for passing the members when moving in the second direction and engaging the members when moving in the first direction; and wherein
   the means for moving comprises a reversible drive means connected to the first means for engaging and the second means for engaging.

9. Means for driving a continuous conveyor as defined in claim 8 wherein means for moving further comprises:
   a continuous loop linear flexible drive extending along the conveyor;
   a drive pulley for driving the linear flexible drive and connected to the reversible drive means; and
   an idler pulley;
   and wherein the first means for engaging comprises a first pawl engaged with one portion of the linear flexible drive between the drive pulley and idler pulley, and
   the second means for engaging comprises a second pawl mounted on the other portion of linear flexible drive between the idler pulley and drive pulley.

10. A conveyor system comprising:
    a continuous loop track;
    a plurality of intermittently spaced article moving members movable along the track;
    means for interconnecting the article moving members in a continuous loop extending around the track;
    first means for engaging alternate ones of the article moving members irrespective of their spacing adjacent a portion of the track for driving said alternate members in a first direction; and
    second means for engaging the other alternate ones of the article moving members irrespective of their spacing adjacent the portion of track for driving said other alternate members in the first direction.

11. A conveyor system as defined in claim 10, wherein the track comprises a parallel set of rails;
    the article moving members each comprise a cart mounted between the rails; and
    the means for interconnecting comprises a linear flexible drive.

12. A conveyor system as defined in claim 11 wherein each of the carts comprises:
    a substantially open forward end;
    a substantially closed rearward end; and
    a selectively openable bottom.

13. A conveyor system as defined in claim 12 wherein the track comprises:
    an article receiving portion;
    an inclined drive engagement portion;
    a cart inverting discharge portion; and
    a return portion between the inverting portion and the article receiving portion.

14. A conveyor system as defined in claim 13, further comprising dumping station between the drive engagement portion of the track and the cart inverting portion of the track for selectively opening the bottom of the carts.

15. A conveyor as defined in claim 14, wherein the first and second means for engaging each comprise:

a pawl for engaging a cart when moving in the first direction and for passing a cart when moving in a second direction opposite to the first direction; said conveyor comprising:
a continuous loop linear flexible drive;
a drive pulley for the linear flexible drive;
an idler pulley for the linear flexible drive; and
reversible drive means connected to the drive pulley; and wherein
the first and second drive pawls are connected to the continuous loop flexible drive in separate portions between the idler pulley and the drive pulley and between the idler pulley and the drive pulley respectively.

16. A conveyor as defined in claim 14, further comprising:
third means engaging alternate ones of the carts in synchronism with the first means for engaging; and
fourth means for engaging the other alternate ones of the carts in synchronism with the second means for engaging;
the first and second means for engaging being on one side of the carts and the third and fourth means for engaging being on the other side of the carts.

* * * * *

PO-1050
(5/69)

UNITED STATES PATENT OFFICE
CERTIFICATE OF CORRECTION

Patent No. 3,679,045           Dated July 25, 1972

Inventor(s) George W. Morgan, Douglas S. Whitney

It is certified that error appears in the above-identified patent and that said Letters Patent are hereby corrected as shown below:

Column 3, line 32, delete "The side member such as, for example, a heavy steel casting 38."

Column 4, line 42, "by" should be --be--.

Column 8, line 7, and Column 8, line 10, "lugs" should be --members--.

Signed and sealed this 17th day of April 1973.

(SEAL)
Attest:

EDWARD M. FLETCHER, JR.
Attesting Officer

ROBERT GOTTSCHALK
Commissioner of Patents